US012613697B2

(12) United States Patent
Frumkin et al.

(10) Patent No.: US 12,613,697 B2
(45) Date of Patent: Apr. 28, 2026

(54) TILED COMPRESSED SPARSE MATRIX FORMAT

(71) Applicant: Nvidia Corporation, Santa Clara, CA (US)

(72) Inventors: Michael Alex Frumkin, Los Altos, CA (US); Jeff Pool, Durham, NC (US); Lung Sheng Chien, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/247,922

(22) Filed: Jan. 15, 2019

(65) Prior Publication Data

US 2019/0278600 A1      Sep. 12, 2019

Related U.S. Application Data

(60) Provisional application No. 62/641,201, filed on Mar. 9, 2018.

(51) Int. Cl.
| | |
|---|---|
| *G06F 9/30* | (2018.01) |
| *G06F 9/38* | (2018.01) |
| *G06F 17/16* | (2006.01) |
| *G06N 3/04* | (2023.01) |

(52) U.S. Cl.
CPC ........ *G06F 9/30036* (2013.01); *G06F 9/3877* (2013.01); *G06F 9/3885* (2013.01); *G06F 17/16* (2013.01); *G06N 3/0418* (2013.01)

(58) Field of Classification Search
CPC .. G06F 9/30036; G06F 9/3877; G06F 9/3885; G06F 17/16
See application file for complete search history.

(56) References Cited

U.S. PATENT DOCUMENTS

| | | | | |
|---|---|---|---|---|
| 10,169,296 | B2 * | 1/2019 | Korthikanti | .......... G06N 3/0454 |
| 2017/0193361 | A1 * | 7/2017 | Chilimbi | ................ G06N 3/084 |
| 2017/0293659 | A1 * | 10/2017 | Huang | .................... H03M 7/30 |

(Continued)

OTHER PUBLICATIONS

Dongarra, "Survey of Sparse Matrix Storage Formats," retrieved from https://netlib.org/linalg/html_templates/node90.html, Nov. 20, 1995, 1 page.

(Continued)

*Primary Examiner* — Michael D. Yaary
(74) *Attorney, Agent, or Firm* — Davis Wright Tremaine LLP

(57)      ABSTRACT

Approaches in accordance with various embodiments provide for the processing of sparse matrices for mathematical and programmatic operations. In particular, various embodiments utilize a tiling approach that divides a sparse matrix into submatrices, many of which will include only zero-value entities. These empty tiles can be ignored, and only the tiles with non-zero entries processed, which reduces resource and time requirements for the processing. An indexing approach can be used for each entity that is a combination of the tile identifier and an offset value, which enables the values to be multiplied correctly against, for example, values of a dense matrix. The tiles can be processed in parallel and the results accumulated to generate a matrix product. The matrix product can then be passed to the next step in a process or operation, such as to a next layer in a deep neural network.

20 Claims, 8 Drawing Sheets

(56) References Cited

U.S. PATENT DOCUMENTS

| | | | | |
|---|---|---|---|---|
| 2017/0316312 A1 * | 11/2017 | Goyal | .......................... | G06F 7/48 |
| 2018/0189234 A1 * | 7/2018 | Nurvitadhi | .............. | G06F 17/16 |
| 2019/0205746 A1 * | 7/2019 | Nurvitadhi | ............. | G06N 3/063 |

OTHER PUBLICATIONS

Kjolstad et al., "The Tensor Algebra Compiler," Computer Science and Artificial Intelligence Laboratory Technical Report, Feb. 17, 2017, 16 pages.
Nvidia, "CUDA Toolkit Documentation v10.0.130," retrieved from https://docs.nvidia.com/cuda/archive/10.0/, Oct. 30, 2018, 6 pages.
Smith et al., "Tensor-Matrix Products with a Compressed Sparse Tensor," Proceedings of the 5th Workshop on Irregular Applications: Architectures and Algorithms, 2015, 7 pages.

* cited by examiner

200

$$\begin{pmatrix} a_{11} & a_{12} \dots & a_{1m} \\ a_{21} & a_{22} \dots & a_{1m} \\ \dots & \dots & \dots \\ a_{n1} & a_{n2} \dots & a_{nm} \end{pmatrix} \times \begin{pmatrix} b_{11} & b_{12} \dots & b_{1p} \\ b_{21} & b_{22} \dots & b_{1p} \\ \dots & \dots & \dots \\ b_{m1} & b_{m2} \dots & b_{mp} \end{pmatrix} = \begin{pmatrix} c_{11} & c_{12} \dots & c_{1p} \\ c_{21} & c_{22} \dots & c_{1p} \\ \dots & \dots & \dots \\ c_{n1} & c_{n2} \dots & c_{np} \end{pmatrix}$$

Matrix A         Matrix B         Matrix C
(sparse)         (dense)          (product)

Matrix A
(sparse)

$$\begin{pmatrix} 1 & 1 & 0 & 0 & 0 & 0 & 0 & 1 \\ 1 & 0 & 0 & 0 & 0 & 0 & 0 & 0 \\ 0 & 0 & 0 & 0 & 0 & 0 & 0 & 0 \\ 1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 0 & 0 & 0 & 0 \\ 0 & 0 & 0 & 0 & 0 & 0 & 0 & 0 \end{pmatrix}$$

Sparse Matrix in Nested Matrix Format

Sparse

Dense

400

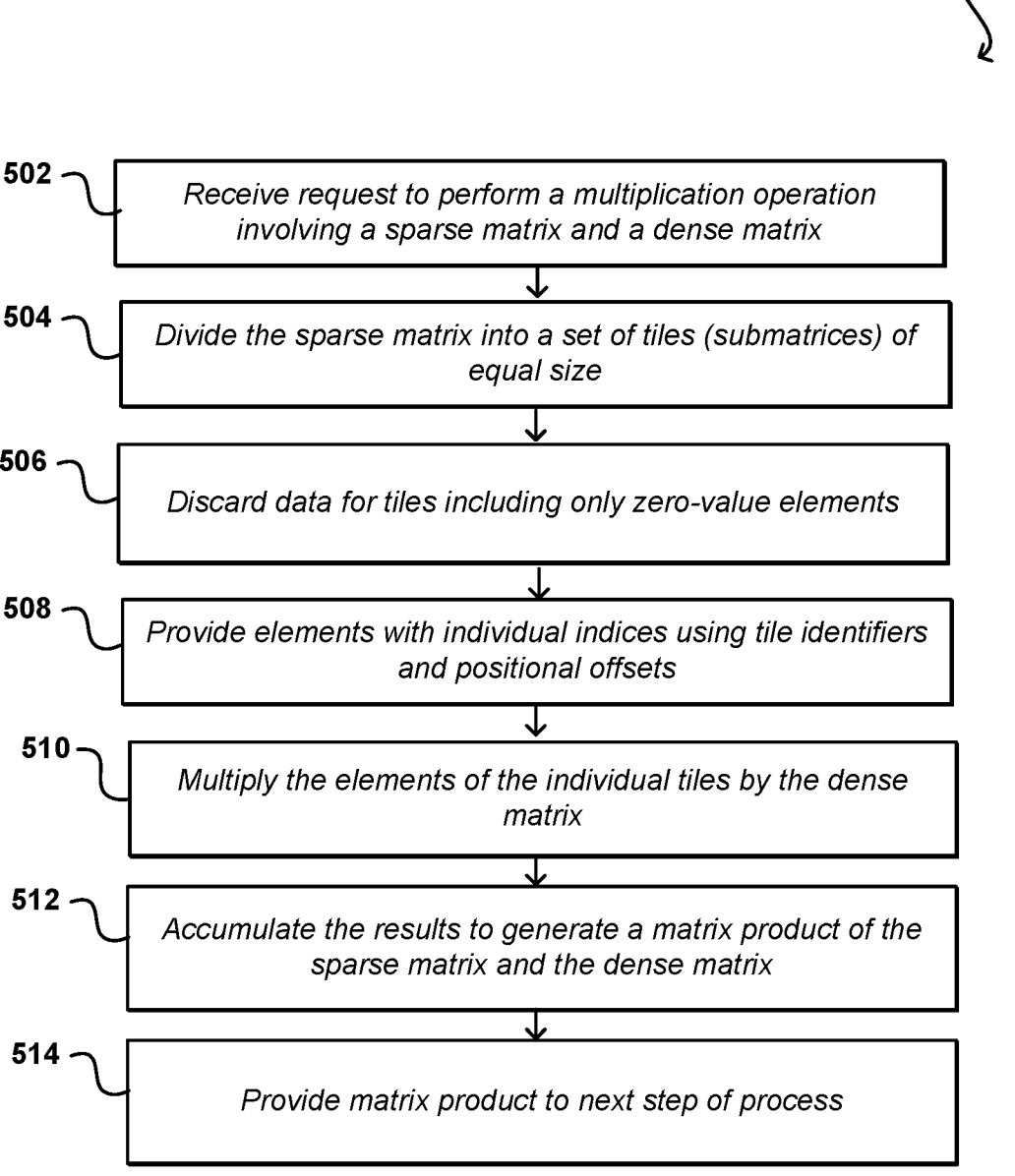

500

502 — Receive request to perform a multiplication operation involving a sparse matrix and a dense matrix 504 — Divide the sparse matrix into a set of tiles (submatrices) of equal size 506 — Discard data for tiles including only zero-value elements 508 — Provide elements with individual indices using tile identifiers and positional offsets 510 — Multiply the elements of the individual tiles by the dense matrix 512 — Accumulate the results to generate a matrix product of the sparse matrix and the dense matrix 514 — Provide matrix product to next step of process

Input Layer 702

Output Layer 707

Unclassified

Inferences

Intermediate Layers 704

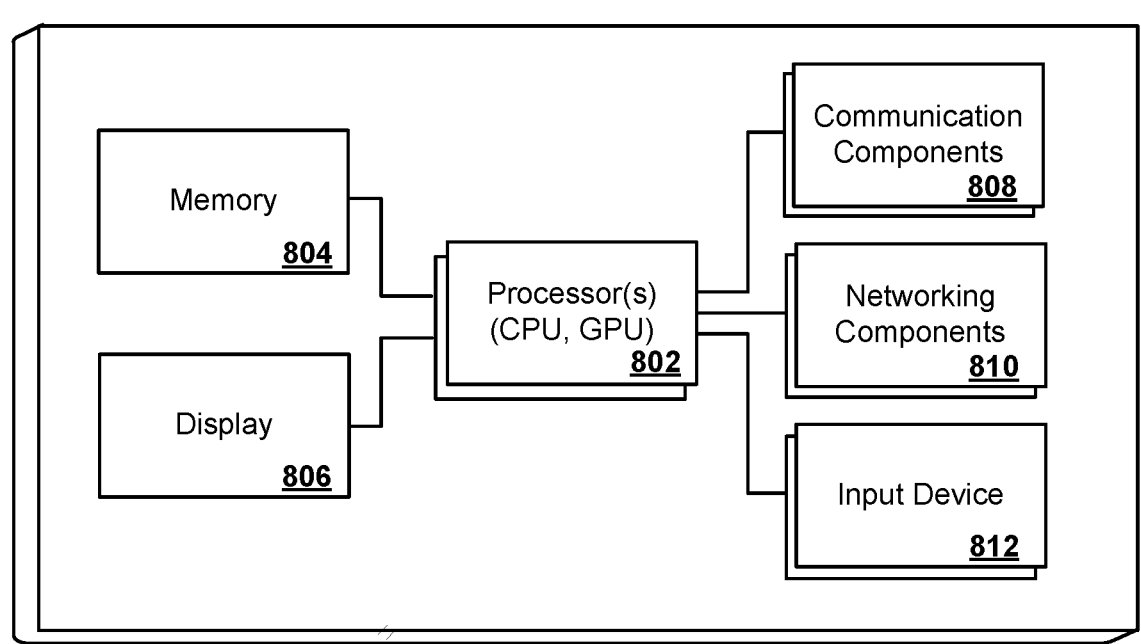
FIG. 8

TILED COMPRESSED SPARSE MATRIX FORMAT

CROSS-REFERENCE TO RELATED APPLICATIONS

This application claims priority to U.S. Provisional Application Ser. No. 62/641,201, filed Mar. 9, 2018, entitled "Tiled Compressed Sparse Row Format," which is hereby incorporated herein in its entirety for all purposes.

BACKGROUND

Sparse workloads are common in high-performance computing. For example, sparse matrices can be utilized to represent structures and relationships between objects. Machine learning also often involves sparse matrices in one or more network layers. As machine learning and other computing operations become more complex and utilize larger sets of data, the need to maintain large amounts of data for sparse matrices or data sets becomes problematic as zero-value elements may not impact the outcome but require significant overhead to store and process.

BRIEF DESCRIPTION OF THE DRAWINGS

Various embodiments in accordance with the present disclosure will be described with reference to the drawings, in which:

FIGS. 2A and 2B illustrate matrices of a sparse matrix multiplication task that can be performed in accordance with various embodiments.

FIG. 5 illustrates an example process for using tiling for sparse matrix multiplication that can be utilized in accordance with various embodiments.

FIG. 8 illustrates example components of a computing device that can be used to implement aspects of the various embodiments.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the processing of sparse matrices for mathematical and programmatic operations. In particular, various embodiments utilize a tiling approach that divides a sparse matrix into submatrices, many of which will include only zero-value entities. These empty tiles can be ignored for purposes of the computation, and only the tiles with non-zero entries processed, which reduces resource requirements for the processing. An indexing approach can be used for each entity that is a combination of the tile identifier and an offset value, which enables the values to be multiplied correctly against, for example, values of a dense matrix. The tiles can be processed in parallel and the results accumulated to generate a matrix product. The product can then be passed to a next step in a process, such as to a next layer in a deep neural network.

In some embodiments, an analysis is performed with respect to a minimum number of cache misses that any Sparse Matrix by dense Matrix Multiplication algorithm (SpMM) must incur. The lower bound on cache misses can be expressed through properties of a graph represented by the sparse matrix; specifically, through properties of the covering of the graph by sets fitting into the cache and having a minimal boundary. In particular, for matrices with uniformly distributed non-zeros, these sets can be approximated by rectangular tiles. An optimal aspect ratio of these tiles can be computed as a function of cache size and matrix density. A number of different SpMM algorithms are presented for use with various embodiments.

Cache misses can be optimized in SpMM algorithms. First, the cache misses are analyzed that must be incurred by the algorithm on a simple system model with a shared L1 cache. In at least some embodiments, the minimum is attained, for algorithms which cover the iteration space, with sets that fit in cache and have a minimum boundary, or isoperimetric sets. For sparse matrices with uniformly distributed non-zeros, these coverings can be rectangular blocks, and the optimal aspect ratio of these blocks can be analytically parametrized.

Various other functions can be implemented within the various embodiments as well as discussed and suggested elsewhere herein.

Figure 1:
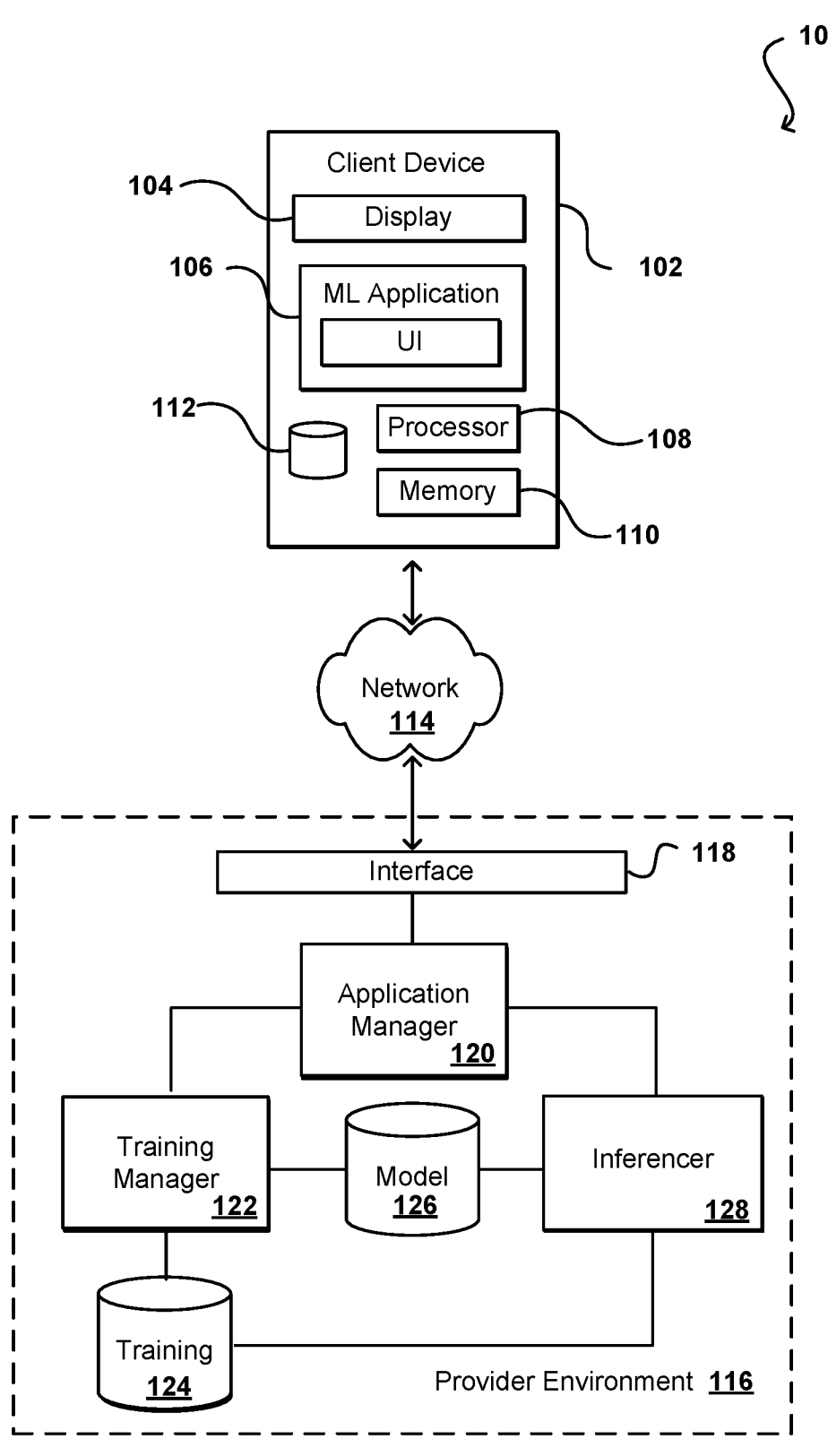
FIG. 1 an example system that can be utilized to implement aspects in accordance with various embodiments.

FIG. 1 illustrates an example environment 100 that can be utilized to implement aspects of the various embodiments. In some embodiments, a user may utilize a client device 102 to provide input, such as data to be processed or instructions to perform an operation, among other such options. The client device 102 can be any appropriate computing device capable of enabling a user to provide instructions or data for processing, such as may include a desktop computer, notebook computer, smart phone, tablet computer, computer workstation, gaming console, and the like. A user can select, provide, or otherwise specify the input via a user interface (UI) of an application 106, referred to herein as a machine learning (ML) application that utilizes machine learning for at least one aspect of the application functionality. The ML application 106 can be executing on the client device 102, although at least some functionality may also operate on a remote device, networked device, or in "the cloud" in some embodiments. The user can provide input to the UI, such as through a touch-sensitive display 104 or by directing movement of a mouse cursor displayed on a display screen, among other such options. The client device can include at least one processor 108 (e.g., a CPU or GPU) to execute the application and/or perform tasks on behalf of the application, and memory 110 for including non-transitory computer-readable instructions for execution by the processor. Data provided to, or generated via, the ML application 106 can be stored locally to local storage 112, such as a hard drive or flash memory, among other such options.

In some embodiments, input received or selected on the client device 102 can be processed on the client device 102 in order to perform the appropriate functionality. In other embodiments, the client device 102 may send the input, or data relating to the input, over at least one network 114 to be received by a remote computing system or service, as may be part of a resource provider environment 116. The at least one network 114 can include any appropriate network, including an intranet, the Internet, a cellular network, a local area network (LAN), or any other such network or combination, and communication over the network can be enabled via wired and/or wireless connections. The provider environment 116 can include any appropriate components for receiving requests and returning information or performing actions in response to those requests. As an example, the provider environment might include Web servers and/or application servers for receiving and processing requests, then returning data or other content or information in response to the request.

Communications received to the provider environment 116 can be received to an interface layer 118. The interface layer 118 can include application programming interfaces (APIs) or other exposed interfaces enabling a user, client device, or other such source to submit requests or other communications to the provider environment. The interface layer 118 in this example can include other components as well, such as at least one Web server, routing components, load balancers, and the like. Components of the interface layer 118 can determine a type of the request (or other communication), and can direct the request to the appropriate system or service. For example, if a communication relates to the training of a neural network, the communication can be directed to an application manager 120, which can be a system or service provided using various resources of the provider environment 116. The communication, or information from the communication, can be directed to a training manager 124, which can select an appropriate model or network and then train the model using relevant training data 124, which in some embodiments might be provided or specified by the received communication. Once a network is trained and successfully evaluated, the network can be stored to a model repository 126, for example, that may store different models or networks for different types of data or processing. If a request is received to the interface layer 118 that includes input for the application that requires processing, information for the request can be directed to an inference module 128 (referred to herein as a "inferencer"), system, or service that can obtain the corresponding trained network, such as a trained generative adversarial network (GAN) as discussed herein, from the model repository 126 if not already stored locally. The inferencer 128 can take the input from the ML application 106 executing on the client device 102 and cause the input to be processed using the appropriate trained model(s) to generate one or more inferences.

In various embodiments the processor 108 (or a processor of the training manager 122 or inferencer 128) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

In some embodiments the matrix multiplication is implemented on a single GPU that includes multiple streaming multiprocessors (SMs). SMs can work independently and in parallel. Each SM can be assigned one or more of the tiles of the sparse matrix for processing as discussed later herein, and can perform the appropriate multiplication of those tiles times the dense matrix. The tiling can be performed as part of a pre-processing step in some embodiments, either on the GPU or on a CPU. For large matrices or numbers of tiles, multiple GPUs may be utilized for the processing. The final product can then be sent to the CPU if needed, but is often kept on the GPU and passed to the next layer of the neural network.

As mentioned, machine learning networks such as deep neural networks can be sparse or involve sparse matrix operations in one or more layers of the networks. If a sparse matrix represents adjacency between objects, the multiplication of a sparse matrix by a vector (SpMV) is accumulating weights of the adjacent objects of each entry. In at least some embodiments it may be desirable to obtain a stable distribution of weights that does not change after redistribution, where finding such distributions may involve the iterative application of SpMV. If multiple independent fields are defined on the objects, like multiple species in combustion codes, then sparse by dense matrix multiplication (SpMM) can be used, as well as potentially batched sparse matrix-vector product algorithms. As heavy workloads involving sparse neural networks and sparse accelerators are becoming increasingly common, there is a desire to improve performance, such as the performance of an SpMM operation involving a sparse matrix multiplied by a dense matrix.

FIG. 2A illustrates a basic example 200 of the form of a matrix multiplication involving a sparse matrix A being multiplied by a dense matrix B. As discussed in more detail elsewhere herein, a "sparse" matrix can correspond to a matrix where the ratio of zero-value entities to non-zero value entities is high, such that a majority of the elements in the matrix have a value of zero. This is illustrated in the example sparse matrix 250 of FIG. 2B. A dense matrix B, on the other hand, would have a low ratio of zero-value entities to non-zero value entities, such that a small minority of the elements in the matrix have a value of zero. As illustrated in FIG. 2B, a majority of the data to be stored for a sparse matrix, which also includes a significant amount of corresponding metadata, corresponds to elements with zero value that do not impact the product of the matrix multiplication.

Approaches in accordance with various embodiments address these and other aspects of sparse matrix operations by attempting to consider only non-zero elements in those operations. Such an approach can help to reduce the amount of memory and processing capacity needed for those operations, which can also help to improve the speed of those operations.

Sparse matrices as currently utilized have a few standard representation formats, some of which provide for substantial memory requirement reductions by storing only the non-zero entities. The data structure that is appropriate for a given sparse matrix can depend in part upon aspects such as the number and distribution of non-zero entities. Accessing the individual elements becomes more complex and additional structures are needed to be able to correctly and completely recover the original matrix. Some formats, such as dictionary of keys (DOK) or list of lists (LIL) support efficient matrix modification, while other formats such as compressed sparse row (CSR) and compressed sparse column (CSC) support efficient access and matrix operations. These standard formats, however, come with significant overhead, such as twice the overhead of the initial sparse matrix. These standard formats typically allow for skipping of the zero value elements by creating pointers to the non-zero elements, but the pointers themselves take up significant space in the storage of the matrix. These formats generally also have poor memory locality.

Figure 3A:
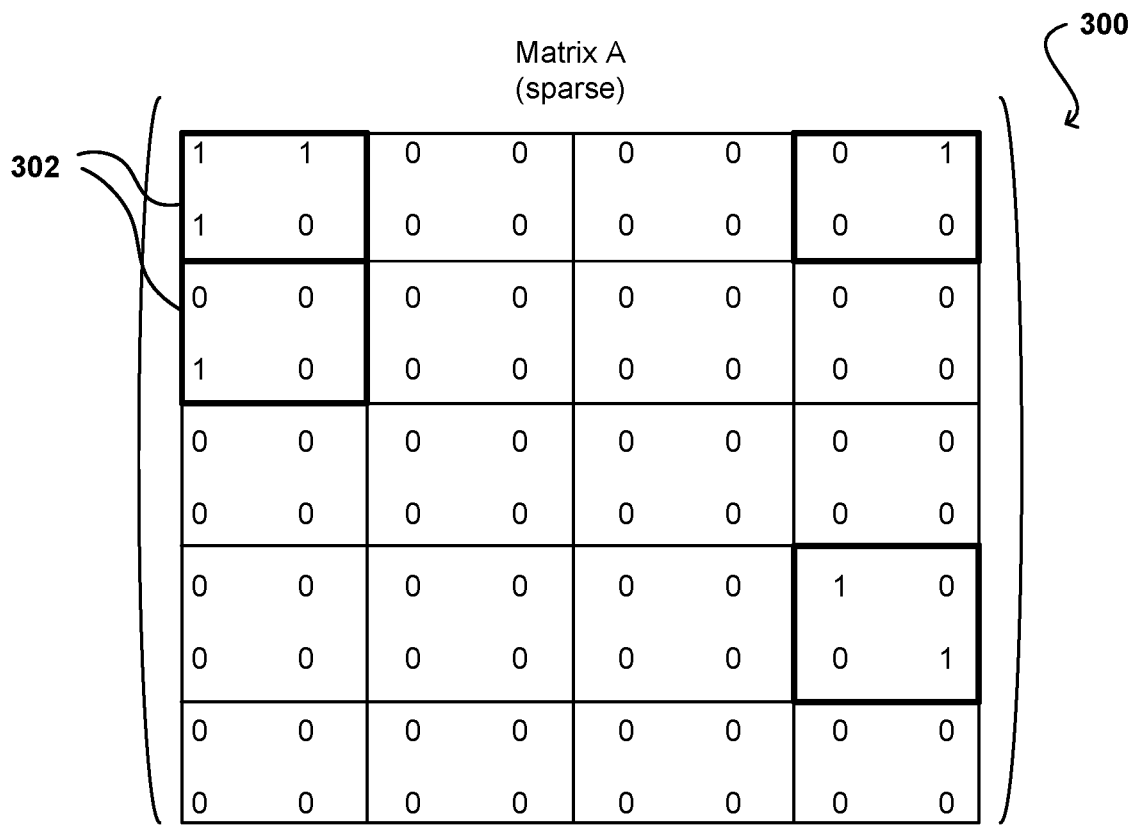
FIGS. 3A, 3B, and 3C illustrate an example tiling approach that can be utilized in accordance with various embodiments.
Figure 3B:
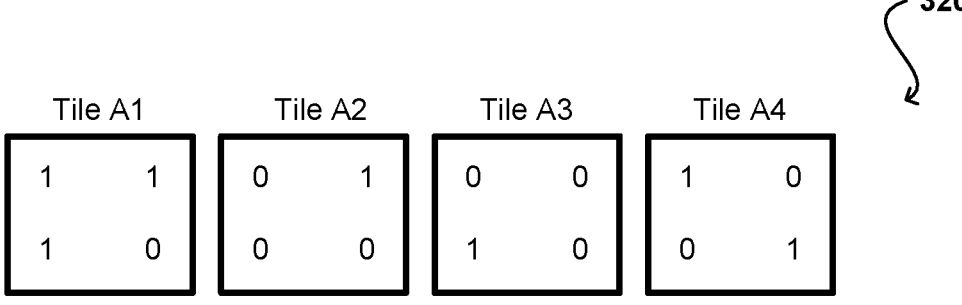

Approaches in accordance with various embodiments can reduce the memory overhead needed to represent a sparse matrix with respect to one of these conventional formats. Further, such approaches can improve memory locality through the organization of non-zero elements into tiles, or submatrices. FIG. 3A illustrates an example tiling approach that can be utilized in accordance with various embodiments. In this example, a (small for example purposes) sparse matrix 300 is illustrated wherein a significant majority of the entries have zero values. The sparse matrix can be divided or segmented into a number of tiles, or submatrices, of the same size, although in other embodiments different sizes might be used as well. In this example the tiles are two by two, but any appropriate tile size might be used as discussed elsewhere herein. As illustrated, once the example sparse matrix 300 is divided into tiles or submatrices, sixteen of the twenty tiles can be determined to include zero-value entities only. Accordingly, these tiles can be skipped and only the tiles 302 with non-zero entities can be considered. As illustrated in FIG. 3B, this can result in consideration for processing purposes of a set 320 of four tiles, with significantly less data than was present in the original sparse matrix. Such an approach thus can reduce the memory overhead as discussed, while providing improved locality with respect to conventional matrix representation formats (e.g., CSR or CSC).

Such approaches can be used advantageously in various situations where sparse matrix multiplication may be utilized. As mentioned, one such situation involves deep learning. The propagation of activations for deep neural networks often use sparse weights, where the weightings themselves may be sparse matrices. Such approaches can reduce the overhead of representing these sparse weights for machine learning, while improving the locality of accessing the sparse weights when needed for activation multiplication.

Figure 3C:
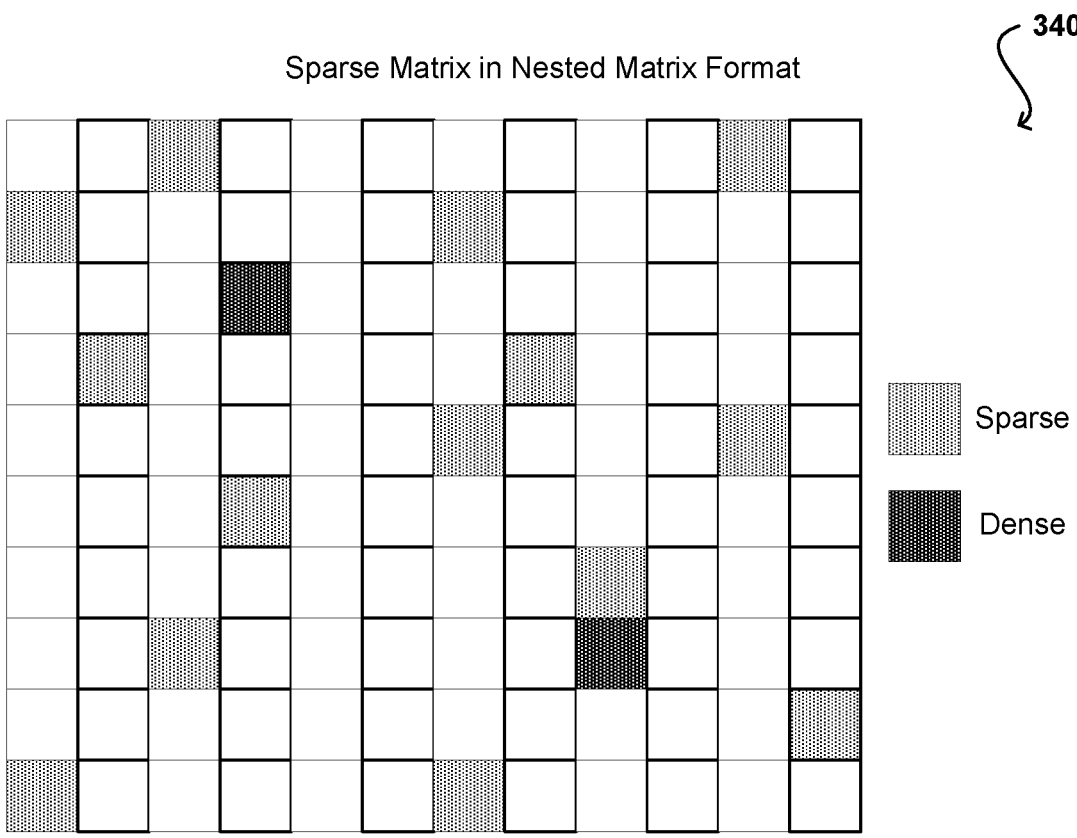

Each tile can be a matrix, even potentially a sparse matrix, represented in an existing or conventional format. An advantage of such an approach is that each tile will have a small range of indices, allowing for an eight bit index representation in some embodiments. As an example, FIG. 3C illustrates an example of a sparse matrix 340 in a nested matrix format, including empty tiles (white), as well as sparse and dense tiles, where each of those tiles or submatrices is itself a sparse or dense matrix. Such a nested CSR (or CSC) format can be used advantageously as discussed herein. In one embodiment each tile is a 256×256 matrix. Other dimensions are possible as well as discussed herein, such as 256×128, 128×512, etc. The indices can be reserved for entities with non-zero values. In one embodiment, the address of an element can be computed as the address of the tile plus an offset within the tile, which in some embodiments is an eight-bit offset. This provides an advantage in savings of metadata representing the sparse data. As mentioned, the tiles can all have the same height and width in at least some embodiments. The height and width values can be selected in some embodiments in order to minimize cache misses, and the height and width values may also depend in some extent upon the density of the matrix (i.e., the ratio of the number of zero-value elements to the number of non-zero value elements). And entire matrix can then be covered with the tiles, such that each element belongs to one and only one tile or submatrix. The non-zero elements that go into each tile can then be represented in a standard format, such as CSR. Another advantage is that the separation of a single matrix into a set of tiles enables the various tiles to be processed concurrently, which can improve the speed of processing and result in reduced latency of operations. The use of such a format differs from existing approaches further in the fact that the format considers the matrix elements in blocks, instead of in rows or columns.

Approaches to memory management can center around disk input/output (I/O) operations and can be thought of in terms of primary storage and secondary storage. This can be appropriate for various applications, where matrices may fit in secondary storage (e.g., DRAM) but may be too large to fit in primary storage, such as processor cache. Providing lower bounds for I/O can be useful for several algorithms, including matrix multiplication and fast Fourier transform (FFT) algorithms. Approaches in accordance with various embodiments can provide improved SpMM algorithms and can utilize a new compressed sparse format, referred to herein as "NestedCSR."

Example algorithms can be represented in machine-independent form by directed graphs of basic blocks ("BB"). A BB representation of sparse matrix vector multiplication (SpMV) c=Ab can be specified by the following code:

```
for (int i = 0; i < num__rows; ++i)
{
        C[i]=0;
        for (int j = row__start[i];
                j < row__start [i + 1]; ++j)
        {
                c[i] += A[j] * b [idx[j]];
        }
}
```

Here, the standard CSR representation of A is used, with row_start indicating the start of rows and idx representing the index of elements of b. Execution of this program can be performed using multiple architectures. Execution can be done serially or in parallel, such as with one thread per row or with several threads calculating partial sums of each row. Execution of the program can be represented by a trace, which is a directed acyclic graph, in contrast to the BB graph mentioned previously. A node of the trace can be executed without violating the semantics of the program only if all values on incoming nodes are resident in the cache. A determination can be made as to the number of cache loads that must be performed as a function of the problem size, cache size, and properties of the matrix A.

Input and output nodes (nodes with in-degree 0 and out-degree 0 respectively) can represent input and output of the trace. Internal nodes represent machine instructions performed on arguments indicated by arcs incoming to the node. The trace graph of SpMV has inputs A, idx. b, constant 0, and output c. Internal nodes of the graph represent operations of updating c[i]. There can be at least two special cases of SpMV, relating to the filtering of images and the solving of partial differential equations (PDEs). When filtering an image with a kernel, the kernel can be applied to each internal pixel and a weighted sum of the pixels covered by the kernel produced. In this case, the kernel has fixed size, normally much smaller than size of the image. The kernel coefficients could reside in a small fraction of the cache.

Another special case can involve applying a finite difference operator, such as a seven- or thirteen-point stencil, to the values of a field, normally defined on a three- or four-dimensional grid). In this case, the coefficients of the operator will also occupy a small fraction of the cache. In the general SpMV case, if A is square and sparse with few non-zero elements in each row and column, the size of A is much larger than sizes of b and c. The matrix A and index idx are used only once, streaming through the cache. It means that cold misses of A and idx dominate cache loads in the general SpMV case. For low density A in the SpMM case, sizes of A and idx are significantly smaller than sizes of B and C, such as at 10% density. A and idx are about 10× smaller than sum of sizes of B and C. For low density SpMM the high cache misses result in saturation of DRAM interface and cause a significant slowdown of the application.

As mentioned, approaches in accordance with various embodiments can derive lower bounds for cache misses based on properties of A, and these cache misses can be reduced by tiling the sparse matrix. In one example, a trace of a computation can be transformed into a bulk I/O form. A trace in the bulk I/O form interleaves DRAM I/O to, and from, the buffer with computations that use only the buffer and cache, and no DRAM I/O. Let the original trace use cache of size S and execute B read/write operations. A bulk I/O trace will do S consecutive I/O operations, flushing data from the buffer and prefetching data for the next computational phase. S consecutive I/O operations are mapped to the prefetching into the buffer and flushing the buffer. The computational phase of a bulk I/O trace will do computations of the original trace using only the buffer and cache. During the computational phase the trace is confined to primary storage of size 2S. The number of nodes of a graph $G=(V, A)$ can be computed assuming that data are residing in the primary storage of size S. In our computational model for computing values at node set U, values of all nodes are needed in U and in its boundary $\delta(U)$. The bulk I/O trace computes nodes in U using its 1-neighborhood of size S during each computational phase. Hence, per S I/O operations, the trace computed $S-|\delta(U)|$nodes of G. To minimize the number of I/Os, on each I/O phase the trace should load subsets of V having minimal boundaries. For this, minimal cover of nodes V of the trace graph is determined by sets with 1-in-neighborhood not exceeding S. If an isoperimetric set of size Sin trace graph has boundary T, then using S I/O operations allows for computing values in S-T nodes on G. So, to run the trace on a system with cache size S, the number of cache loads is given by:

$$S*|V|/(S-T)=|V|/(1-T/S)$$

In the cases of image filtering and applying stencil operators to the fields on structured grids, the traces graphs are two-dimensional or multi-dimensional lattice graphs. For these graphs, isoperimetric subgraphs are graphs of cross-polytopes, defined as integer points ω, such that $|\omega|_1 < r$ for some r.

Considering SpMV, it is noted that aggregating nodes of a trace graph by collapsing some edges will not increase the number of I/O operations needed for computation. If the summations needed to compute c[i] into one node are collapsed, ignoring A, idx, and row_start, a bipartite graph is obtained having c and b as the parts of the graph. The matrix A will be the adjacency matrix of the graph. To minimize the number of I/Os to compute the graph, the output nodes of the graph can be covered with sets of size not exceeding S and with minimal boundaries.

As mentioned above, in SpMV, A, idx, and row_start cannot be ignored to obtain useful I/O bounds because loading these data normally exceeds loads needed for loading of b and c. For SpMM, with the number of columns in B sufficiently large, contribution to I/O from the sparse matrix becomes small relative to B and C, providing useful low bounds for I/O. If a node-collapsing operation is applied to the trace of SpMM as performed for SpMV, several copies of bipartite graphs are obtained, one per column of B. The nodes corresponding to elements of A are then added back in. To do that, nodes representing A are added back, and extra nodes are added to each arc connecting b[idx[j], k] with c[i,k]. The original arc connecting A[j] with the node on the edge is then added.

Figure 4:
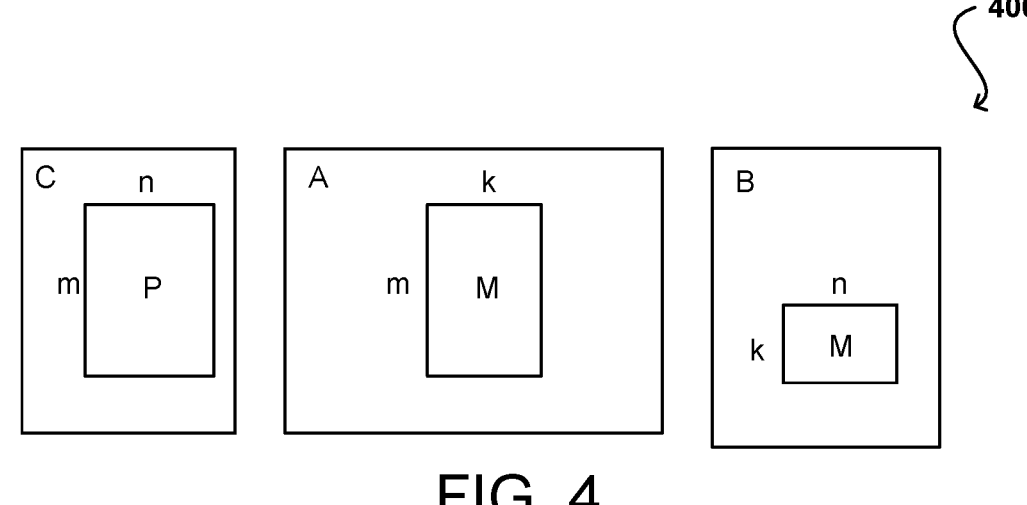
FIG. 4 illustrates an example estimation of a maximum number of operations that can be executed in accordance with various embodiments.

It is assumed that A has density d and its elements are uniformly distributed for the remainder of this section of description. The square matrix test cases and some ONMT matrices fit this description. Analysis of the second order terms due to randomness are out of the scope of this paper. P outputs of C can be computed using Q inputs of B and M values of A. Also let P, Q and M be contained in m×n, k×n, and m×k blocks of C, B and A, respectively, as illustrated in the estimation 400 of FIG. 4. As illustrated, some rows of C that do not contain elements of P can be removed, with corresponding rows and columns of A and B, without impacting the results. For the total number of the operations V, i.e., the number of nodes in the computational trace that can be covered, there are the following relations:

$$V \leq Pdk, \; V \leq Qdm$$

Multiplying the inequalities, taking into account that P<mn, Q<kn, and taking the square root, the calculation arrives at the inequality:

$$V \leq dmnk$$

This inequality becomes equality if P, Q, and M are rectangular blocks of C, B and A. In this case, M contains all non-zeros of the m×k block of A.

The calculation can now estimate m, n, and k that minimize boundary of the set in the application trace that computes the m×n block of C by loading the m×k block of A and multiplying it by the k×n block of B. The constraint that the data must fit in S during the computational phase gives the following inequality:

$$m \times k \times d + k \times n + m \times n \leq S$$

To find optimal matrix sizes that maximize the number of nodes in the trace and satisfy this constraint, renaming can be performed for l/m, d/n, l/k asp, q, r to get the inequality:

$$p + q + r \leq p \times q \times r \times S/d$$

Using inequalities between arithmetic mean and geometric mean provides:

$$(p \times q \times r)^{-2} \leq (S/3d)^3$$

Using the fact that an inequality becomes equality only if all elements attain the same value, optimal tiling sizes are given by:

$$m = k = \sqrt{\frac{S}{3d}} \, , n = \sqrt{\frac{dS}{3}}$$

In summary, to minimize cache misses for matrices of density d with uniformly distributed non-zeros, tiles can be used with this aspect ratio in at least some embodiments.

A goal when developing such algorithms is to reduce the application's time to completion. Since the precision or the number of operations is not changed, focus can be set on minimizing cache misses as this can be the main factor affecting performance in at least some embodiments. Working with rectangular tiles of the matrices can help to minimize the number of cache misses in various models of computations.

When looking for a practical implementation on an example GPU, it can be necessary in some embodiments to take into account other aspects of the architecture, such as may include bank conflicts when multiple threads are attempting to access the same data in the first level cache at the same time, or accessing shared memory (SMEM) that only certain groups of threads may access, or high TLB miss rates for small pages and high sparsity. Therefore, several tiled SpMM algorithms can be utilized that address all these specifics in their own ways.

Two such algorithms are referred to herein as "csrmm-_reduceA" and "csrmm_repeatA". These algorithms each fetch one tile of matrix B into SMEM. The former, csrmm-_reduceA multiplies the tile by the appropriate values in the matrix A and computes a partial tile of C. The final tile of C is assembled from partial sums. The latter, csrmm_repeatA, fetches a tile of B into SMEM and each thread reads whatever values from A are needed to compute a whole dot-product without final reduction. Their design is based on the various considerations.

For example, because both A and B matrices are dense in traditional GEMM, they play the same role in algorithm design. The algorithm fetches A and B to SMEM and computes a partial sum of C=A×B. To reach the best performance, each thread computes one dot-product, and threads pre-fetch data to hide memory latency with computation. However, the sparsity of A breaks this symmetry in SpMM. As a result, it is not efficient to pre-fetch A into SMEM because a column index of A may not have corresponding entry of B in SMEM. It is reasonable to fetch B into SMEM and to load A from global memory directly. However, deciding how to load A can then become an important performance factor. One option is to load A in a coalesced manner but pay for reduction in the end. The other way is to load A frequently without doing a final reduction. The former gets best memory efficiency while loading A, but each thread computes the partial sum of a dot product, and the necessary final reduction may cost on the order of 20% of runtime. The latter highly depends on performance of the L2 cache, for example, because the same entry of A will be loaded several times.

The next step is to choose tile size to minimize overhead of loading A, and to achieve high GPU utilization (also commonly referred to as "occupancy"). Assuming a tile of A is M×K, a tile of B is K×N, and a tile of C is M×N. from traditional analysis of GEMM, the overhead of loading A is dmnk/N and overhead of loading B is mnk/M. If B is pre-fetched into SMEM with size K×N, the size of SMEM limits the parameters K and N. The size of SMEM used also impacts occupancy. Since A is fetched from global memory, it is reasonable to have a large N, i.e., N>M, even though large N implies small K under the same amount of SMEM. Second, pre-fetching is not necessary because the computation does not start until the column index of A is ready, so it is impossible to hide the memory latency of loading B by computation of C=A×B as long as the column index and value of A are not ready. Third, it is necessary to remap the partial sum of A×B to update of C in order to keep full coalesced access of C. Based on these requirements, M, K, and N are left for performance tuning. It turns out that the L2 cache can efficiently support A if N is big enough.

A third algorithm in accordance with various embodiments is referred to herein as "csrmm_colB". This algorithm loads a tall tile of B (as many columns of C as can fit in SMEM) and then multiplies them by A, computing a few full columns of C. Since SMEM accesses can conflict if threads access the same bank (e.g., if SMEM is accessed with large stride), A can be preprocessed, reordering the rows so that the index in each row has a different value (modulo number of banks) from previous rows. Such re-ordering may not always be possible, but any good approximation can provide a significant (e.g., 20%-30%) performance gain. Advantages include the fact that each element of A loaded by a thread is reused multiple times across the tile, and it loads elements of B into SMEM only once. On the other hand, it may have to synchronize threads after loading a tile of B in SMEM, which precludes overlapping the loads and computations. Along with csrmm_reduceA and csrmm_repeatA, it is exposed to SMEM conflicts that depend on distribution of non-zeros in A.

Another example algorithm that can be used in accordance with various embodiments is referred to as "csrmm-_tiled". This algorithm tiles the matrix A with tiles of fixed dimension h×w. A unique format can be utilized for this algorithm, whose data members are shown below (class methods are standard accessors/mutators and are omitted for clarity):

```
template <typename T, typename SI>
class NestedCsrMatrix {
        CsrMatrix<T, SI>** val;
        SI* cols;
        Int* row__starts;
        int64 nnz;
        int num__rows;
        int num__cols;
        int symmetric;
        int tile__height;
        int tile__width;
};
``` where CsrMatrix is a pointer to an array of tiles, each of which is a matrix stored in standard CSR format. T is the type of the elements in each tile. SI is the index type of both cols in the NestedCsrMatrix as well as in each tile. A noteworthy benefit of templating SI is that it need not be a full 32b data type. For example, if num_rows, num_cols, tile_height, and tile_width are all less than or equal to 256, then SI can be an unsigned char. In at least some embodiments, NestedCsr-Matrix is the primary data structure. The matrix is a nested CSR matrix (such as is illustrated in the example of FIG. 3C) with a pointer to the various tiles. Each tile to be considered has a number of non-zero value elements, and each tile has a number of rows and a number of columns that are the same for all tiles. Such an algorithm can also tell whether the matrix is symmetric.

As mentioned, it can be helpful to think of this structure as a "nested" sparse matrix, where each element of a CSR matrix is, in fact, another CSR matrix. In addition to saving storage on index values with narrower data types, this also permits entire tiles to be skipped if they do not contain nonzero values. The algorithm (csrmm_tiled) to process this structure uses a normal block matrix-matrix multiplication algorithm to compute tiles of C. Rather than using SMEM, csrmm_tiled relies on the L1 cache, so no synchronizations are necessary and loads can be overlapped with the computations. The algorithm completes one full tile of C that does not need further updates. Its disadvantage is that it is exposed to a global load latency as it may need to load A and B from DRAM.

As mentioned, such approaches can be used advantageously to handle the sparsity in deep neural networks. Deep Neural Networks (DNNs), such as Convolutional and Recurrent Neural Networks (CNNs and RNNs, respectively), are very powerful tools for solving various problems, but require accordingly powerful hardware to produce and use. As such, there has been much work in simplifying these networks to reduce the computational and memory requirements, leading to the application of techniques such as singular-value decomposition, quantization, and network pruning. This last technique has reduced the effective size of a variety of models, but does not always lead to a performance increase as the resulting sparsity is hard to take advantage of unless extra care is taken to make the sparsity pattern regular by design. Typical densities for pruned recurrent networks are around 10%.

An example pruned network that can be utilized in accordance with various embodiments is GoogLeNet used for image classification. The GoogLeNet image classification network has been pruned without regard for structure. It has many convolutional layers and one fully-connected layer, with densities ranging from 21% to 51%. This pruned network has an accuracy that is comparable with (in fact, slightly higher than) the baseline dense network. Each pruned layer has a very different distribution of non-zero values, and there are no layers with entire rows of zeros. The data-agnostic workloads in each layer vary from very small to very large, in contrast to the ONMT layers, below, which have a fixed size.

Another example pruned DNN that can be utilized is a pruned Long-Short Term Memory cell network, a complex type of RNN that performs multi-language translation. This architecture is the default multi-way translation network in OpenNMT. A "class-blind" pruning can be performed per layer, which does not treat the gates in the recurrent cell as unique; rather, their weights are all considered for pruning as a unit. The accuracy of this pruned network remains high. The pruned, sparse weight matrices from this network are both smaller and denser than traditional sparse matrices from PDE or graphs applications which often have less than 1% density. This is an important point, as this sparsity regime has been the topic of optimization before, but algorithms are applied in various embodiments without considering the training process or recasting the sparse matrices. The non-zero distribution qualifies as random and uniform in average. For instance, if rows were sorted by length, only about a 5% length variation would be observed at each quartile. Within each row, the non-zero elements are spread with an irregular pattern. The distribution does still have sporadic irregularities. A few rows are completely empty. The proportion of empty rows is 2% on average. Finally, the top 2% largest rows are 30% larger than the median row size. The sparsity pattern of the transposed matrix was found to have similar properties.

FIG. 5 illustrates an example process 500 for using tiling for sparse matrix multiplication that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a request to perform a multiplication operation is received 502, where that operation involves a sparse matrix and a dense matrix. Various other matrix operation requests can be received as well within the scope of the various embodiments. The sparse matrix can be divided 504 into a set of tiles, or submatrices, of equal size. The size can be square or rectangular as discussed herein, and may be based upon the density of the matrix among other such factors. The tiles can be generated in a CSR format in at least some embodiments, and may themselves comprise sparse matrices. The tiles can be analyzed and any tile including only zero-value elements, or any empty tiles, can be discarded 506 or ignored for purposes of the matrix multiplication operation. As part of the tiling algorithm, elements of the tiles can be provided 508 with individual indices using the tile identifiers and positional offsets. The elements of the individual tiles can then be multiplied 510 by the dense matrix. The multiplication of the various tiles can occur independently and at least partially in parallel or concurrently. The results of the various tile multiplications can then be accumulated 512 to generate a matrix product of the sparse matrix and the dense matrix. The matrix product can then be provided 514 to the next step of the process, which for machine learning may involve passing the matrix product or result to a next layer of the DNN.

As mentioned, in some embodiments an cache (or other such cache or temporary storage) can be used rather than shared memory. A tile of the sparse matrix can be loaded into the L1 cache then multiplied by the dense matrix. An advantage of using the L1 cache is that there is no need to synchronize each time the matrix tile is loaded into the L1 cache. In shared memory all threads have to wait until everything for the tile is loaded in shared memory, in at least some embodiments. Tiles can also be split into sub-tiles and processed on different threads in some embodiments, while multiple layers of tiling can be used in various embodiments for very large matrices.

As mentioned, various embodiments take advantage of machine learning. As an example, deep neural networks (DNNs) developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and generally infer new information.

Neural networks rely heavily, on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 6:
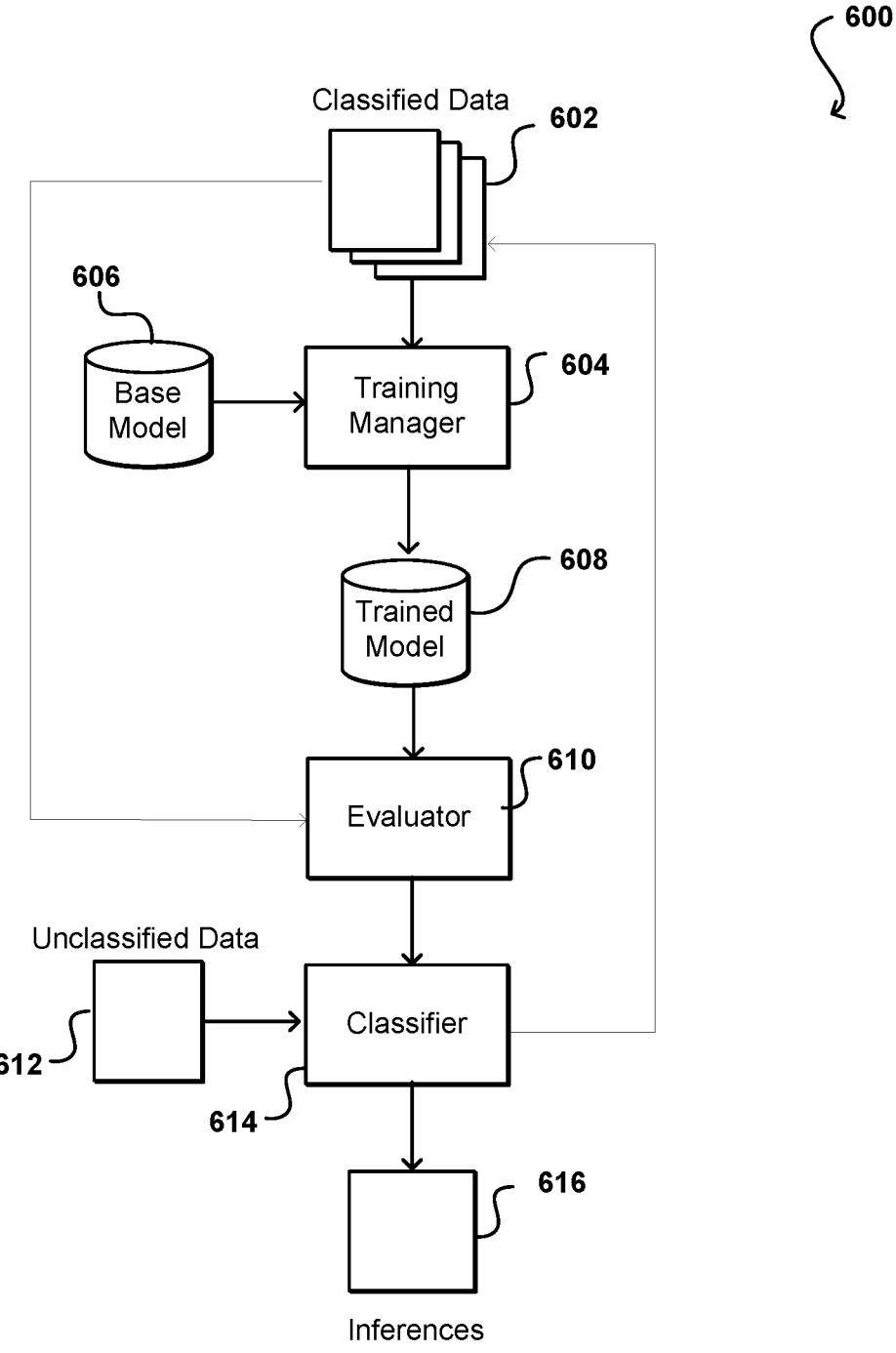
FIG. 6 illustrates an example system for training an image synthesis network that can be utilized in accordance with various embodiments.

FIG. 6 illustrates an example system 600 that can be used to classify data, or generate inferences, in accordance with various embodiments. Various predictions, labels, or other outputs can be generated for input data as well, as should be apparent in light of the teachings and suggestions contained herein. Further, both supervised and unsupervised training can be used in various embodiments discussed herein. In this example, a set of classified data 602 is provided as input to function as training data. The classified data can include instances of at least one type of object for which a statistical model is to be trained, as well as information that identifies that type of object. For example, the classified data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The classified data 602 in this example is provided as training input to a training manager 604. The training manager 604 can be a system or service that includes hardware and software, such as one or more computing devices executing a training application, for training the statistical model. In this example, the training manager 604 will receive an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 604 can select a base model, or other untrained model, from an appropriate repository 606 and utilize the classified data 602 to train the model, generating a trained model 608 that can be used to classify similar types of data. In some embodiments where classified data is not used, the appropriate based model can still be selected for training on the input data per the training manager.

The model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data; if the patterns are few and simple, the resulting model will be small. Input data that has a large number of raw attributes (input columns) or derived features (outputs of the data transformations) will likely have more patterns found and stored during the training process.

In some embodiments, the training manager can make multiple passes or iterations over the training data to discover patterns. There may be a default number of passes, such as ten passes, while in some embodiments up to a maximum number of passes may be set, such as up to one hundred passes. In some embodiments there may be no maximum set, or there may be a convergence or other criterion set which will trigger an end to the training process. In some embodiments the training manager can monitor the quality of patterns (i.e., the model convergence) during training, and can automatically stop the training when there are no more data points or patterns to discover. Data sets with only a few observations may require more passes over the data to obtain higher model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict a product type, where the training data includes movie, toy, and video game product types. The data might be sorted by product type before uploading. The algorithm can then process the data alphabetically by product type, seeing only data for a type such as movies first. The model will begin to learn patterns for movies. The model will then encounter only data for a different product type, such as toys, and will try to adjust the model to fit the toy product type, which can degrade the patterns that fit movies. This sudden switch from movie to toy type can produce a model that does not learn how to predict product types accurately. Shuffling can be performed in some embodiments before the training data set is split into training and evaluation subsets, such that a relatively even distribution of data types is utilized for both stages. In some embodiments the training manager can automatically shuffle the data using, for example, a pseudo-random shuffling technique.

When creating a machine learning model, the training manager in some embodiments can enable a user to specify settings or apply custom options. For example, a user may specify one or more evaluation settings, indicating a portion of the input data to be reserved for evaluating the predictive quality of the machine learning model. The user may specify a recipe that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 608 can be provided for use by a classifier 614 in classifying unclassified data 612. In many embodiments, however, the trained model 608 will first be passed to an evaluator 610, which may include an application or process executing on at least one computing resource for evaluating the quality (or another such aspect) of the trained model. The model is evaluated to determine whether the model will provide at least a minimum acceptable or threshold level of performance in predicting the target on new and future data. Since future data instances will often have unknown target values, it can be desirable to check an accuracy metric of the machine learning on data for which the target answer is known and use this assessment as a proxy for predictive accuracy on future data.

In some embodiments, a model is evaluated using a subset of the classified data 602 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 608 and the evaluator 610 can determine the accuracy of the model by comparing the ground truth data against the corresponding output (or predictions/observations) of the model. The evaluator 610 in some embodiments can provide a summary or performance metric indicating how well the predicted and true values match. If the trained model does not satisfy at least a minimum performance criterion, or other such accuracy threshold, then the training manager 604 can be instructed to perform further training, or in some instances try training a new or different model, among other such options. If the trained model 608 satisfies the relevant criteria, then the trained model can be provided for use by the classifier 614.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources but has failed to generalize the patterns in the data. Overfitting often occurs when the training data includes all of the data used in the evaluation. A model that has been over fit may perform well during evaluation but may fail to make accurate predictions on new or otherwise unclassified data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent over-fitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 600 of FIG. 6, the trained model 610 after evaluation is provided, or made available, to a classifier 614 that is able to use the trained model to process unclassified data. This may include, for example, data received from users or third parties that are not classified, such as query images that are looking for information about what is represented in those images. The unclassified data can be processed by the classifier using the trained model, and the results 616 (i.e., the classifications or predictions) that are produced can be sent back to the respective sources or otherwise processed or stored. In some embodiments, and where such usage is permitted, the now classified data instances can be stored to the classified data repository, which can be used for further training of the trained model 608 by the training manager. In some embodiments the model will be continually trained as new data is available, but in other embodiments the models will be retrained periodically, such as once a day or week, depending upon factors such as the size of the data set or complexity of the model.

The classifier can include appropriate hardware and software for processing the unclassified data using the trained model. In some instances, the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 7:
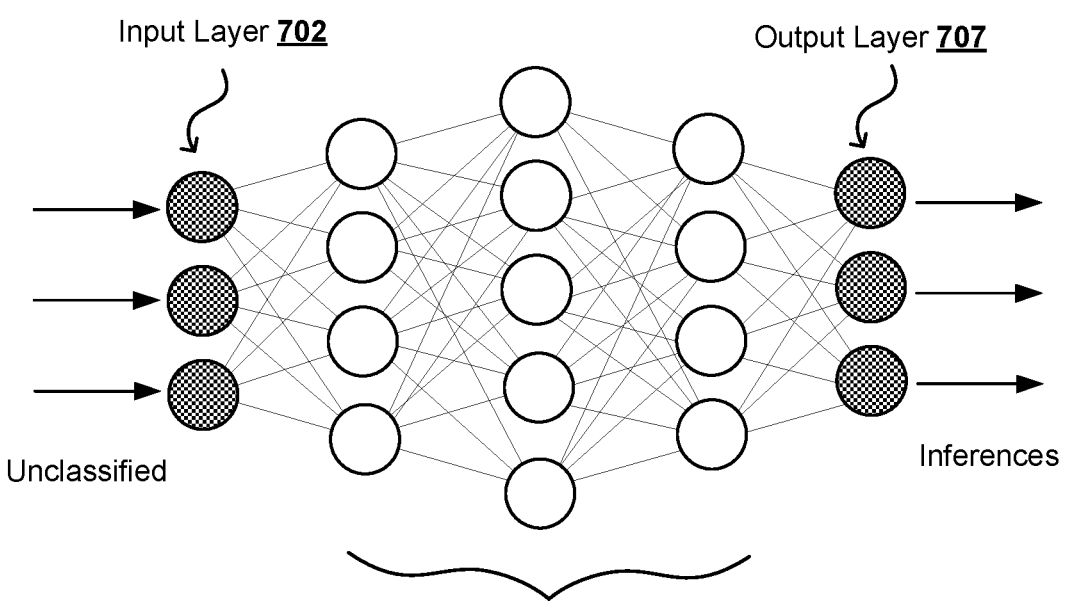
FIG. 7 illustrates layers of an example statistical model that can be utilized in accordance with various embodiments.

FIG. 7 illustrates an example neural network 700, or other statistical model, that can be utilized in accordance with various embodiments. In this example the statistical model is an artificial neural network (ANN) that includes a multiple layers of nodes, including an input layer 702, an output layer 706, and multiple layers 704 of intermediate nodes, often referred to as "hidden" layers, as the internal layers and nodes are typically not visible or accessible in conventional neural networks. As discussed elsewhere herein, there can be additional types of statistical models used as well, as well as other types of neural networks including other numbers of selections of nodes and layers, among other such options. In this network, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of an instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

FIG. 8 illustrates a set of basic components of a computing device 800 that can be utilized to implement aspects of the various embodiments. In this example, the device includes at least one processor 802 for executing instructions that can be stored in a memory device or element 804. As would be apparent to one of ordinary skill in the art, the device can include many types of memory, data storage or computer-readable media, such as a first data storage for program instructions for execution by the processor 802, the same or separate storage can be used for images or data, a removable memory can be available for sharing information with other devices, and any number of communication approaches can be available for sharing with other devices. The device typically will include some type of display element 806, such as a touch screen, organic light emitting diode (OLED) or liquid crystal display (LCD), although devices such as portable media players might convey information via other means, such as through audio speakers. As discussed, the device in many embodiments will include at least communication component 808 and/or networking components 810, such as may support wired or wireless communications over at least one network, such as the Internet, a local area network (LAN), Bluetooth®, or a cellular network, among other such options. The components can enable the device to communicate with remote systems or services. The device can also include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP or FTP. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Python, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising: causing one or more processors to:

access, from at least one first L1 cache of one or more L1 caches of the one or more processors, one or more matrix operands of one or more matrix operations to be performed by the one or more processors, wherein the one or more matrix operands comprise one or more indices to indicate one or more locations, within at least one other L1 cache of the one or more L1, of one or more separately compressed multi-element portions of the one or more matrix operands comprising one or more non-zero values; and perform the one or more matrix operations on the one or more matrix operands indicated by the one or more indices.

2. The computer-implemented method of claim 1, wherein the one or more indices indicate one or more tiled format matrices generated from one or more sparse matrices of data, and further comprising:

generating the one or more tiled format matrices in a compressed sparse row (CSR) format or a compressed sparse column (CSC) format.

3. The computer-implemented method of claim 1, wherein the one or more indices indicate one or more tiled format matrices generated from one or more sparse matrices of data, and further comprising:

generating, using a respective tile identifier and a positional offset in a tile, tile-specific indices for non-zero value elements.

4. The computer-implemented method of claim 1, wherein the one or more indices indicate one or more tiled format matrices generated from one or more sparse matrices of data, and further comprising:

multiplying the one or more tiled format matrices having removed zero value data by a dense matrix of data in parallel using a plurality of streaming multiprocessors (SMs) of a second processing unit, wherein the second processing unit is a graphics processing unit (GPU).

5. The computer-implemented method of claim 4, wherein the one or more indices indicate one or more tiled format matrices generated from one or more sparse matrices of data, and further comprising:

storing data for the one or more tiled format matrices to a Level 1 (LI) cache for the plurality of streaming multiprocessors.

6. A system, comprising:

one or more processors; and memory including instructions that, when executed by the one or more processors, cause the system to:

access, from at least one first L1 cache of one or more L1 caches of the one or more processors, one or more matrix operands of one or more matrix operations to be performed by the one or more processors, wherein the one or more matrix operands comprise one or more indices to indicate one or more locations, within at least one other L1 cache of the one or more L1 caches, of one or more separately compressed multi-element portions of the one or more matrix operands comprising one or more non-zero values; and perform the one or more matrix operations on the one or more matrix operands indicated by the one or more indices.

7. The system of claim 6, wherein the one or more indices indicate one or more tiled format matrices from one or more sparse matrices of data, and wherein the instructions when executed further cause the system to:

multiply the one or more sparse matrices of data by a dense matrix of data, the one or more sparse matrices of data having a higher ratio of zero-value elements to non-zero elements than the dense matrix of data.

8. The system of claim 7, wherein the instructions when executed further cause the system to:

multiply the one or more tiled format matrices having removed zero value data by a dense matrix of data; and accumulate results from multiplying the one or more tiled format matrices to generate a product of the one or more sparse matrices of data and the dense matrix of data.

9. The system of claim 8, wherein the instructions when executed further cause the system to:

multiply the one or more tiled format matrices having the removed zero value data by the dense matrix of data in parallel using a plurality of streaming multiprocessors (SMs) of a graphics processing unit GPU.

10. The system of claim 7, wherein the instructions when executed further cause the system to:

format the one or more tiled format matrices, having removed zero value data, in a compressed sparse row (CSR) format or a compressed sparse column (CSC) format according to a nested matrix format.

11. One or more processors, comprising:

one or more circuits to cause the one or more processors to:

access, from at least one first L1 cache of one or more L1 caches of the one or more processors, one or more matrix operands of one or more matrix operations to be performed by the one or more processors, wherein the one or more matrix operands comprise one or more indices to indicate one or more locations, within at least one other L1 cache of the one or more L1 caches, of one or more separately compressed multi-element portions of the one or more matrix operands comprising one or more non-zero values; and perform the one or more matrix operations on the one or more matrix operands indicated by the one or more indices.

12. The one or more processors of claim 11, wherein the one or more indices indicate one or more tiled format matrices from one or more sparse matrices of data, and wherein the one or more circuits are configured to multiply the one or more sparse matrices of data by a dense matrix of data, the one or more sparse matrices of data having a higher ratio of zero-value elements to non-zero elements than the dense matrix of data.

13. The one or more processors of claim 12, wherein the one or more circuits are configured to:

multiply the one or more tiled format matrices by a dense matrix of data; and accumulate results from multiplying the one or more tiled format matrices to generate a product of the one or more sparse matrices of data and the dense matrix of data.

14. The one or more processors of claim 13, wherein the multiplying of the one or more tiled format matrices by the dense matrix of data is performed in parallel using a plurality of streaming multiprocessors (SMs) of a graphics processing unit (GPU).

15. The one or more processors of claim 12, wherein the one or more circuits are configured to:

obtain the one or more sparse matrices of data and a second matrix of data for a first layer of a deep neural network; and pass a product of the one or more sparse matrices of data and the second matrix of data to a second layer of the deep neural network.

16. The one or more processors of claim 15, wherein the deep neural network is a generative adversarial network (GAN), a convolutional neural network (CNN), or a recurrent neural network (RNN).

17. The one or more processors of claim 12, wherein the one or more circuits are configured to generate the one or more tiled format matrices in a compressed sparse row (CSR) format or a compressed sparse column (CSC) format.

18. The one or more processors of claim 17, wherein the one or more tiled format matrices, having removed zero value data, are matrices in the CSR or CSC format according to a nested matrix format.

19. The one or more processors of claim 12, wherein the one or more circuits are configured to generate, using a respective tile identifier and a positional offset in tile, tile-specific indices for non-zero elements in the one or more tiled format matrices.

20. The one or more processors of claim 12, wherein the one or more circuits are configured to determine a single aspect ratio to use for the one or more tiled format matrices using a density of the one or more sparse matrices of data and a size of a cache to store the one or more tiled format matrices.

\* \* \* \* \*